United States Patent [19]
Nienow

[11] Patent Number: 5,655,817
[45] Date of Patent: Aug. 12, 1997

[54] SECURE SEAT

[76] Inventor: Joseph R. Nienow, 4020 Schofield Ave., Schofield, Wis. 54476

[21] Appl. No.: 607,268

[22] Filed: Feb. 20, 1996

Related U.S. Application Data

[63] Continuation-in-part of Ser. No. 283,218, Jul. 29, 1994, abandoned.

[51] Int. Cl.[6] .......................... A62B 35/00; B60R 21/18; B60R 21/22
[52] U.S. Cl. ................. 297/465; 297/216.11; 297/250.1; 297/487
[58] Field of Search .................. 297/216.11, 487, 297/488, 465, 250.1, 483

[56] References Cited

U.S. PATENT DOCUMENTS

| | | | |
|---|---|---|---|
| 3,278,230 | 10/1966 | Boyce et al. | 297/465 |
| 3,475,052 | 10/1969 | Kaposi | 297/153 |
| 4,754,999 | 7/1988 | Kain | 297/487 |
| 5,375,908 | 12/1994 | Goor | 297/488 |

FOREIGN PATENT DOCUMENTS

| | | | |
|---|---|---|---|
| 2029725 | 5/1992 | Canada | 297/465 |
| 1166419 | 10/1969 | United Kingdom | 297/465 |

*Primary Examiner*—Peter M. Cuomo
*Assistant Examiner*—Anthony D. Barfield
*Attorney, Agent, or Firm*—Tipton L. Randall

[57] ABSTRACT

An assembly for releasably restraining and protecting a child in a transport vehicle. The assembly comprises a contoured safety seat, secured to a standard vehicle seat, with a plurality of fasteners secured to each side of the seat. A torso enclosing suit is worn by the child occupying the seat. The suit has two pairs of fasteners attached near the arm openings and leg openings. The suit fasteners attached to corresponding fasteners in the seat sides securely restrain and protect the seat occupant in case of an vehicle accident. Also disclosed is a removable tray for the seat which deploys and inflates an air bag device in the event of an accident to further protect the seat occupant.

20 Claims, 7 Drawing Sheets

SECURE SEAT

This application is a continuation-in-part of application Ser. No. 08/283,218 filed Jul. 29, 1994, now abandoned.

FIELD OF THE INVENTION

This invention relates generally to safety devices for transport vehicles and, more particularly, is directed to an assembly for releasably restraining and protecting a young person in that transport vehicle.

BACKGROUND OF THE INVENTION

The use of safety belt systems made up of a lap belt and shoulder belt for releasably restraining a person in the seat of a transport vehicle is well known. Use of such a restraining system is mandated by law for automobile vehicles.

These safety belt systems are made to fit adult size people and designed to provide protection for the adult in case of an automobile accident. Young people, particularly infants younger than about 6 years of age, do not fit into these safety belt systems properly and thus, even when used for these youngsters the safety belts do not provide the intended protection in case of an accident.

To overcome this problem, smaller contoured safety seats were developed which more closely fit young people in size. These safety seats are secured to the standard vehicle seat and the youngster is secured within the seat by some type of restraints. These restraints are only marginally useful in protecting the occupant in case of an accident.

Various restraint devices have been disclosed but often the device has some shortcomings which results in the youngster not being fully protected in the case of a vehicle accident.

Cagle in U.S. Pat. No. 1,616,349 discloses a fabric bib-like device, for holding a baby upright, with a number of fasteners which secure to hooks fastened to the frame of a standard vehicle seat.

In U.S. Pat. No. 2,908,324, Muller et al. disclose a seat vest jacket with front lap belt and connected shoulder straps. The vest is connected to a standard safety lap belt with fasteners on each end of the vest lap belt.

Vaughn et al. in U.S. Pat. No. 3,827,716 describe a safety vest which is permanently secured directly to a standard vehicle seat. When seated, a person secures the vest of his body by means of a strap. Also disclosed is an inflatable air bag on the front of the vest which inflates to protect the head of the passenger in the event of an accident.

In U.S. Pat. No. 3,992,040 Gannac discloses a safety harness vest with reinforced belt and shoulder straps which fit over the torso of the wearer. A single dorsal attachment point located in the middle of the back of the vest secures the wearer within a vehicle.

Klich U.S. Pat. No. 4,143,914 describes a safety harness similar to that of Muller et al. which allows the child to recline on a vehicle seat.

In U.S. Pat. No. 4,759,569 Potter discloses a jacket with lap belt and shoulder safety straps built in, and a fastening system which secures the wearer of the garment to a groove in the back of a standard vehicle seat.

In a recent U.S. Pat. No. 5,161,258, Coltrain discloses a vest-like garment with loops which attach the back of the vest to a standard seat belt system and secure a child within a vehicle.

Other patents of interest include Roberts et al. U.S. Pat. No. 3,954,280; Mandracchia et al. U.S. Pat. No. 4,854,607 and Cook U.S. Pat. No. 4,867,464.

All of these disclosed restraint systems have shortcomings in that they are cumbersome to put on, especially for children, and they fail to provide sufficient protection for the child should the vehicle in which the child is riding be involved in an accident.

It is an objective of this invention to protect a young person when riding in a transport vehicle in case of an accident.

It is also an objective to provide a system which is easy to put on a young person prior to entry into the vehicle, as well as being simple to releasably secure the young person to a seat when entering or exiting the vehicle.

Another objective of the invention is to provide a system which will accommodate children of various sizes, as well as long term use for one child as that child grows larger.

It is also an objective to provide a system which distributes the forces encountered in an accident over the entire torso of the young person to prevent internal injury.

SUMMARY OF THE INVENTION

The invention is an assembly for releasably restraining and protecting a young person occupying a seat in a transport vehicle. The assembly comprises a contoured safety seat with a horizontal seat member, a vertical back rest member and two padded seat side members perpendicular to the seat and back rest, with one seat side attached to each side of the seat and back rest. There is included a means for securely fastening the contoured safety seat to a standard transport vehicle seat. Attached to the seat side members are a plurality of pairs of releasable first fastening members. One of each first fastening member pair is attached to one seat side while the other of the fastener pair is attached to the other seat side member. A first pair of fasteners is attached to the seat sides near the intersection of the seat and back rest while a second pair, and optionally a third pair, of fasteners is attached, one above the other, to the seat sides about half way up the back rest member. Pairs of cylindrical cuff members are positioned within apertures in each seat side member. The cuff members receive and secure the legs of a removable tray table.

The assembly also includes a torso enclosing suit with front and back portions, the suit having two leg openings, two arm openings and one neck opening, plus an entry opening, with closure means, for entry of the suit wearer. The suit is equipped with a plurality of pairs of releasable second fastening members, including a first pair of fasteners, one of each secured to the suit just above each leg opening therein, and a second pair of fasteners, one of each secured to the back portion of the suit at the rear of each arm opening therein.

The young person wearing the suit is seated in the safety seat and the fasteners near the leg openings are connected to the fasteners of the seat near the seat and back rest intersect, while the fasteners at the back of the arm openings are connected to one of the pairs the fasteners half way up the back rest members.

DESCRIPTION OF THE PREFERRED EMBODIMENTS

Figure 1:
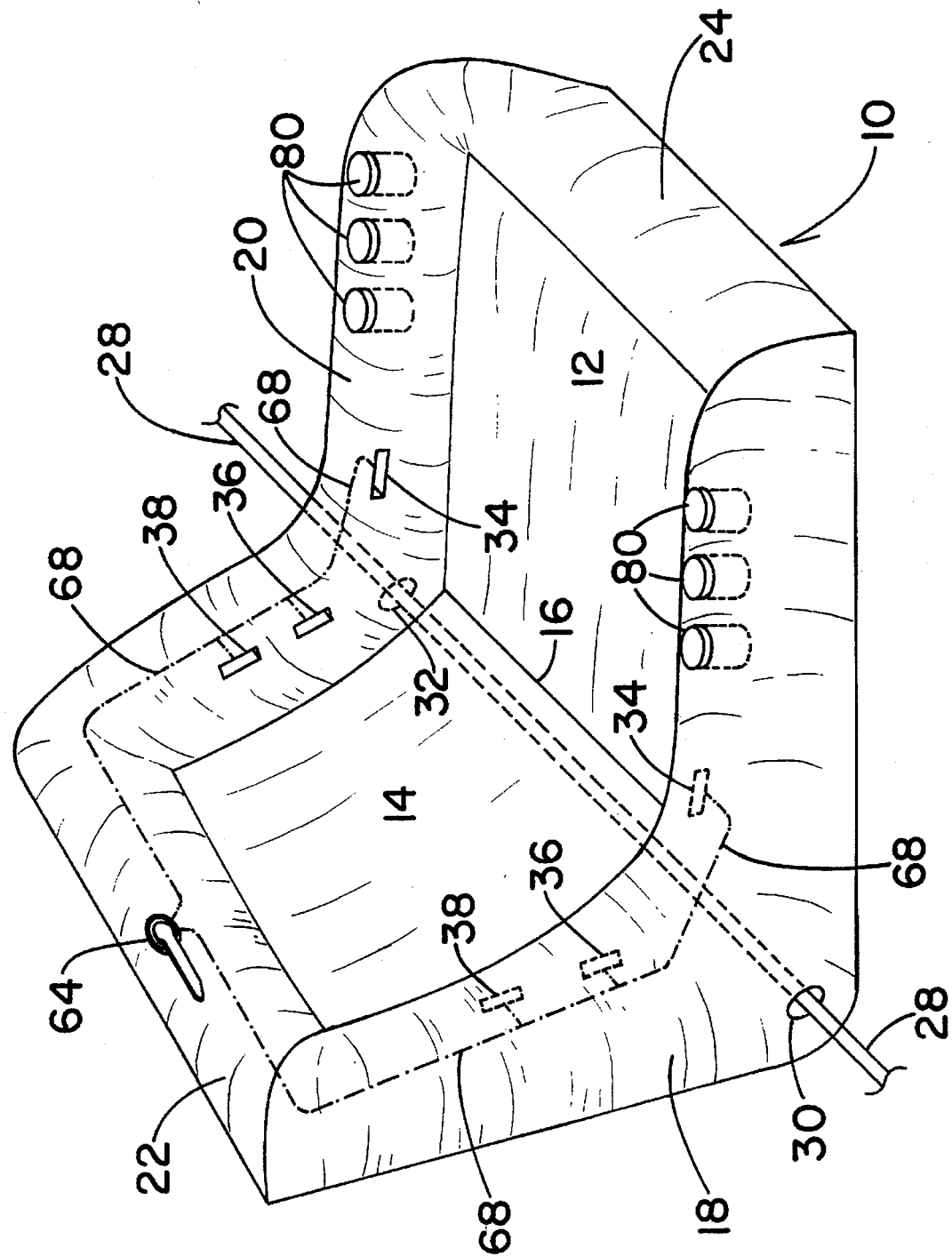
FIG. 1 is a perspective view of the contoured safety seat.

Referring to FIG. 1, a contoured safety seat 10 is shown. The seat comprises a generally horizontal seat member 12 and a generally vertical back rest member 14. The seat and back rest members intersect at a line 16. Both seat and back rest are padded to protect the seat occupant. Attached to the sides of the seat and back rest are a pair of padded seat side members 18 and 20. Attached to the top of the back rest member 14 and the tops of said seat side members, opposite the intersect line 16, is a padded head rest member 22, while at the front of the seat member 12, opposite the intersect line 16, is a padded leg support member 24. The seat, back rest, seat sides, head rest and leg support members may be formed as a single molded contoured unit, made of high-impact plastic or other suitable material. The padding is then secured to the contoured unit. This safety seat forms a supported environment for a young person occupying the seat.

The whole contoured safety seat 10 is fastened securely to a standard transport vehicle seat by a fastening means, for example a standard lap safety belt 28 which threads through apertures 30 and 32 in the seat side members 18 and 20. The lap belt 28 is preferably located behind the back rest or seat member and is drawn tightly against the seat side members to secure the safety seat against the standard vehicle seat. The safety seat may be secured to the standard vehicle seat in a forward facing orientation as shown in FIG. 1, or in a rearward facing orientation. The latter orientation may require a somewhat modified means to fasten the safety seat securely to the standard vehicle seat. Other fastening means for securing the safety seat to a standard seat in a vehicle may be envisioned using multiple fasteners or specially adapted straps. The lap safety belt use is probably the most common means available in most transport vehicles.

Each padded seat side member 18 and 20 contains a plurality of releasable first fastening members, such as female seat belt receptors. A first pair of receptors 34, one on each seat side member, is located adjacent the intersect line 16 between the seat and back rest members, and a second pair of receptors 36, one on each seat side member, is located about half of the distance up the side member adjacent the upright back rest member. A third pair of receptors 38, one on each seat side member, is located even closer to the top of the back rest member 14. The receptor pairs 34, 36, and 38 are located on the inside portions of each seat side member as shown in FIG. 1. The purpose of these locations will become clear as detailed below.

Figure 2:
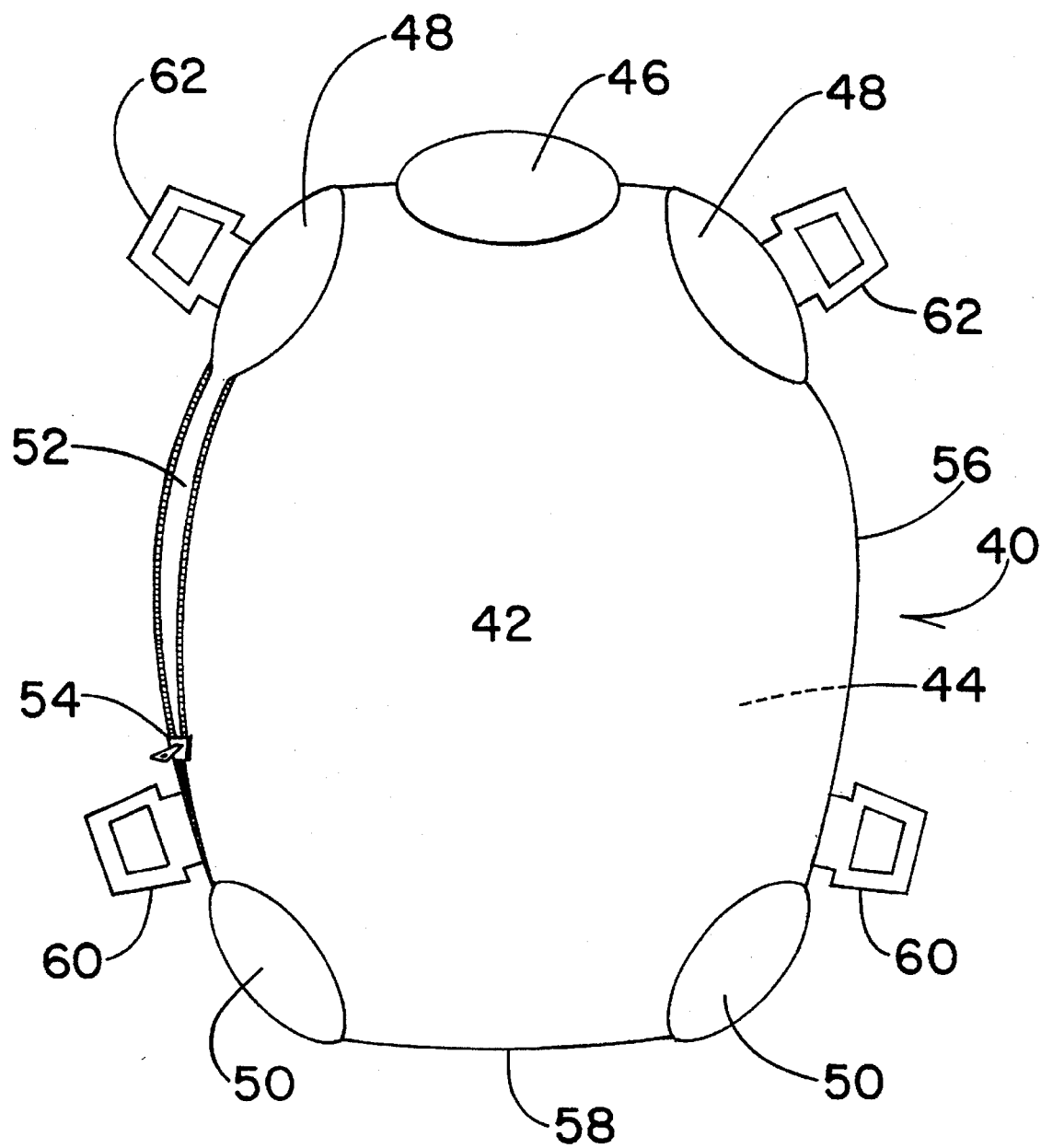
FIG. 2 is a front view of the torso enclosing suit.
Figure 2A:
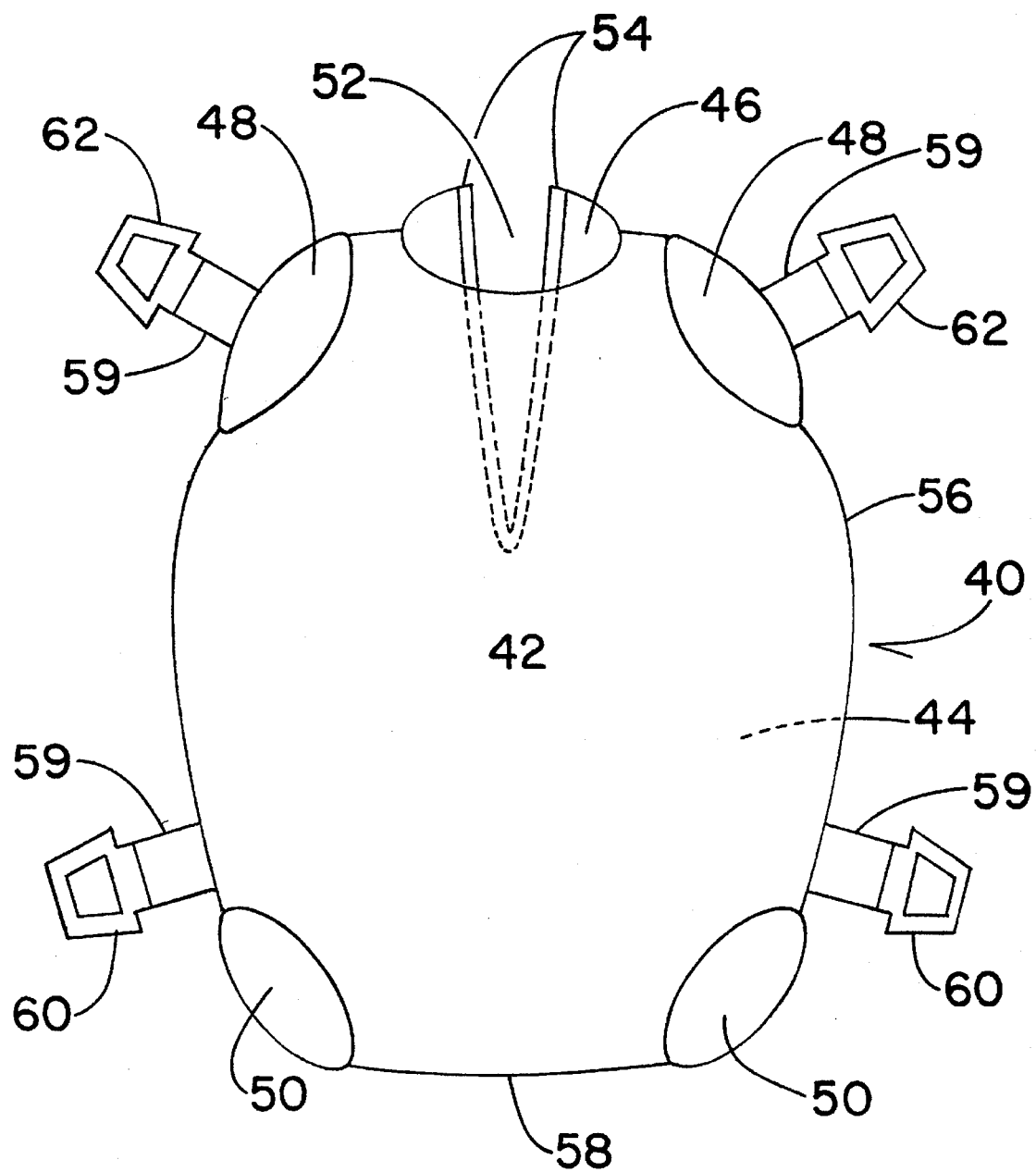
FIG. 2a is a front view of another torso enclosing suit.

Referring to FIG. 2, a torso enclosing suit 40 is shown. The suit 40 comprises a front portion 42 and a back portion 44. The suit contains a neck opening 46, two arm openings 48, and two leg openings 50. There is a closable entry opening 52 which extends from one arm opening 48 to near one leg opening 50, along one side seam. A closure device 54, such as an industrial zipper or VELCRO® brand of loop and hook fastening system, is used to close the entry opening once the suit is in place on the wearer. In an alternative embodiment of the suit 40, shown in FIG. 2a, the entry opening 52 may extend from the neck opening 46 to approximately the center of the back portion 44 of the suit and be closable by means of a similar closure device 54, such as an industrial zipper or a hook and loop fastening system as shown in FIG. 2a. The suit is made of a single piece of high strength fabric material such as nylon or other synthetic fabric, and is continuous over the shoulders on the wearer. In addition to the entry opening, the front and back portions of the fabric are jointed in a seam at the side 56 opposite the entry opening and at the area 58 between the leg openings.

The suit may be a fairly tightly woven fabric or preferably, a mesh type material for greater comfort for the wearer. In addition, several different suits of varying weight may be used for different climatic conditions, i.e., one for winter, one for spring or fall and one for summer.

The suit contains a plurality of pairs of releasable second fastening members, such as male seat belt insertion fasteners, secured directly to the suit. Optionally, a short length of strapping 59 may be employed to secure the fastening members to the suit, as shown in FIG. 2a. However, it is preferred that the fastening members be secured directly to the suit itself. A first pair of fastening members 60, one of which is secured to the fabric just above each leg opening 50, in the pelvis region of the wearer. A second pair of fastening members 62, one of which is secured to the rear of each arm opening 48, across the shoulder region of the wearer. The second pair of fastening members 62 are secured to the back portion of the suit while the first pair 60 are preferably secured to the front portion of the suit.

A young person wearing the suit is placed in the contoured seat in a sitting position. The pair of male fasteners 60 adjacent the leg openings are reversibly fastened to the pair of female fasteners 34 on the seat side members near the seat and back rest intersection, while the pair of male fasteners 62 at the rear of the arm openings are reversibly fastened to the pair of female fasteners 36 near the midpoint of the back rest member of the safety seat. The fastening receptors on the seat side members are spring loaded, similar to a female seat belt receptor, and securely engage the fastening members from the suit when the suit fastener, similar to the male seat belt fasteners, are inserted into the seat side receptors. The suit fastening members are released from the seat side receptors by depressing a button located on each receptor, similar to opening a seat belt closure system. In an alternative embodiment, a means for simultaneously disengaging all fastener pairs is provided. This opening means can be a lever 64 positioned at the top of the head rest member 22. The release lever 64 is slightly recessed into the head rest member 22, and is connected by internal cables 68, or other mechanical means, to all pairs of seat side fastening receptors 34, 36 and 38. Raising the lever pulls the cables which disengage any suit fastening member secured to the fastening receptors and allows the suit wearer to get out of the seat 10. The release cables may be similar to those used in a bicycle braking system. One end of each cable is attached to the lever 64, and the other end is attached to the female fasteners 34, 36 and 38 such that raising the lever 64 moves each cable toward the lever 64, causing the seat fastening receptors to simultaneously disengage the suit fastening members.

The suit may be placed on the young person in a more convenient location external to the vehicle. Likewise the wearer my may keep the suit on when away from the vehicle for short periods of time. Reentering the vehicle for additional travel merely requires that the two pairs of fasteners be reattached, securing the young person safely within the restraining system.

The suit is made of high strength fabric with the fasteners preferably secured directly to the fabric as described above.

There are no belts or straps in the suit which could cause excessive forces to be experienced at points where the belts contact the wearer's torso in the event of an accident. The suit, by virtue of it's design, disperses the forces encountered in an accident over the entire torso of the wearer. The fasteners on the suit preferably are securely fastened directly to the fabric.

Figure 3:
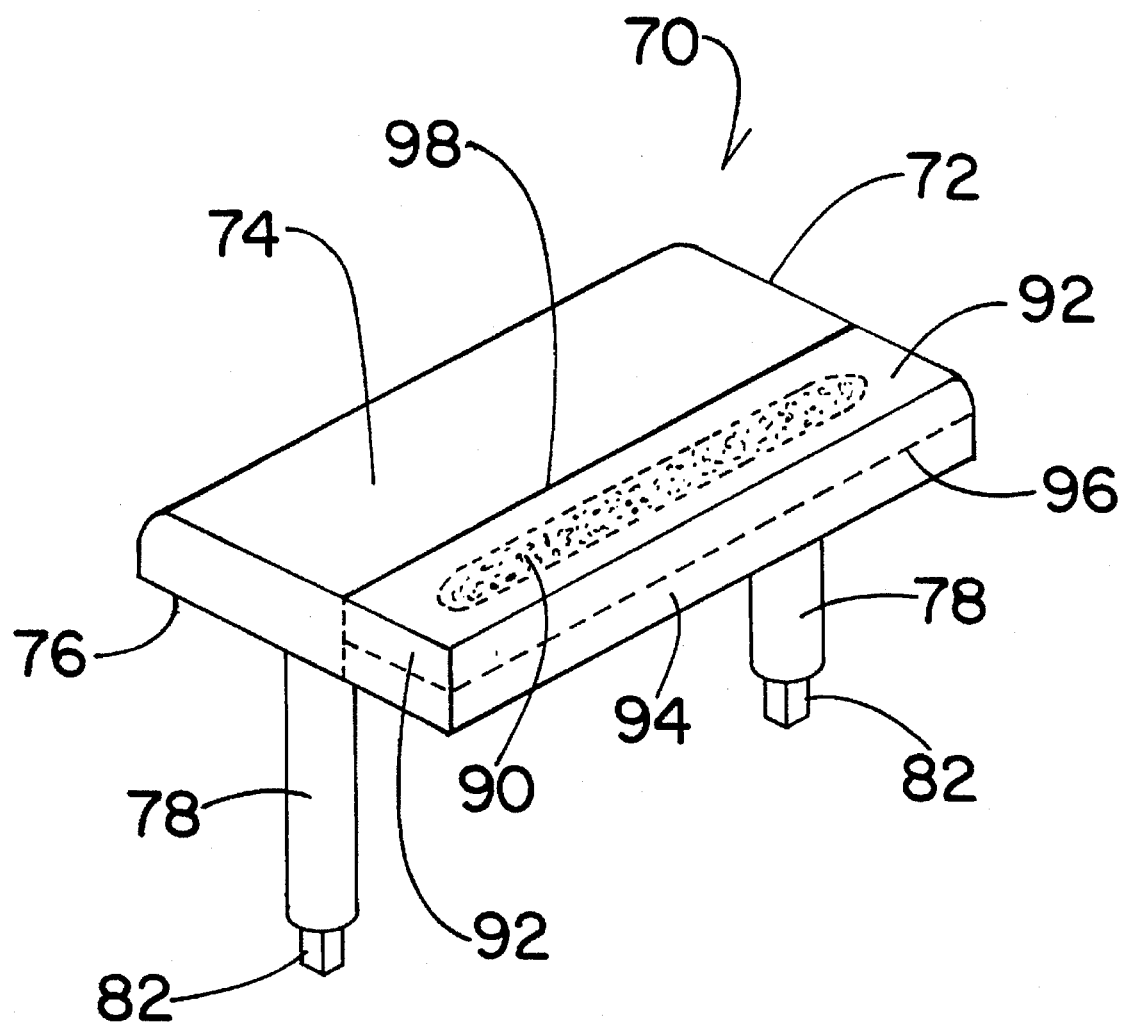
FIG. 3 is a perspective view of the tray table which attaches to the safety seat.

Referring to FIG. 3, the system further includes a removable tray table 70 which is reversibly attached to said contoured safety seat 10. The tray table 70 comprises a horizontal tray portion member 72 with a top portion 74 and a bottom portion 76, and a pair of cylindrical leg members 78 connected to the bottom portion of the tray member. The leg members 78 are positioned near opposite edges of the tray member and fit into a pair of cylindrical notched receptor cuffs 80 in the side arm members 18 and 20 of the contoured safety seat, supporting the tray member 72 at about mid-torso level. The leg members are individually securable within the cylindrical receptor cuffs 80, and are adapted to allow the tray table to pivot away from the seat around the axis of the secured leg, for easy entry of a young person into the seat. Once the young person is positioned in the seat, the tray table is then pivoted back to a closed position and secured in place. Optionally, two or more pairs of cylindrical receptor cuffs 80 may be located in the side members to allow for variable positioning of the tray table and to provide additional seat room as the young person grows in size, as shown in FIG. 1. Likewise, the third pair of receptors 38 on the seat side members can be used to fasten the second pair of fastening members 62 on the suit as the young person grows in size. In this way, a larger size suit can be used with a single safety seat, an economic advantage.

Figure 4:
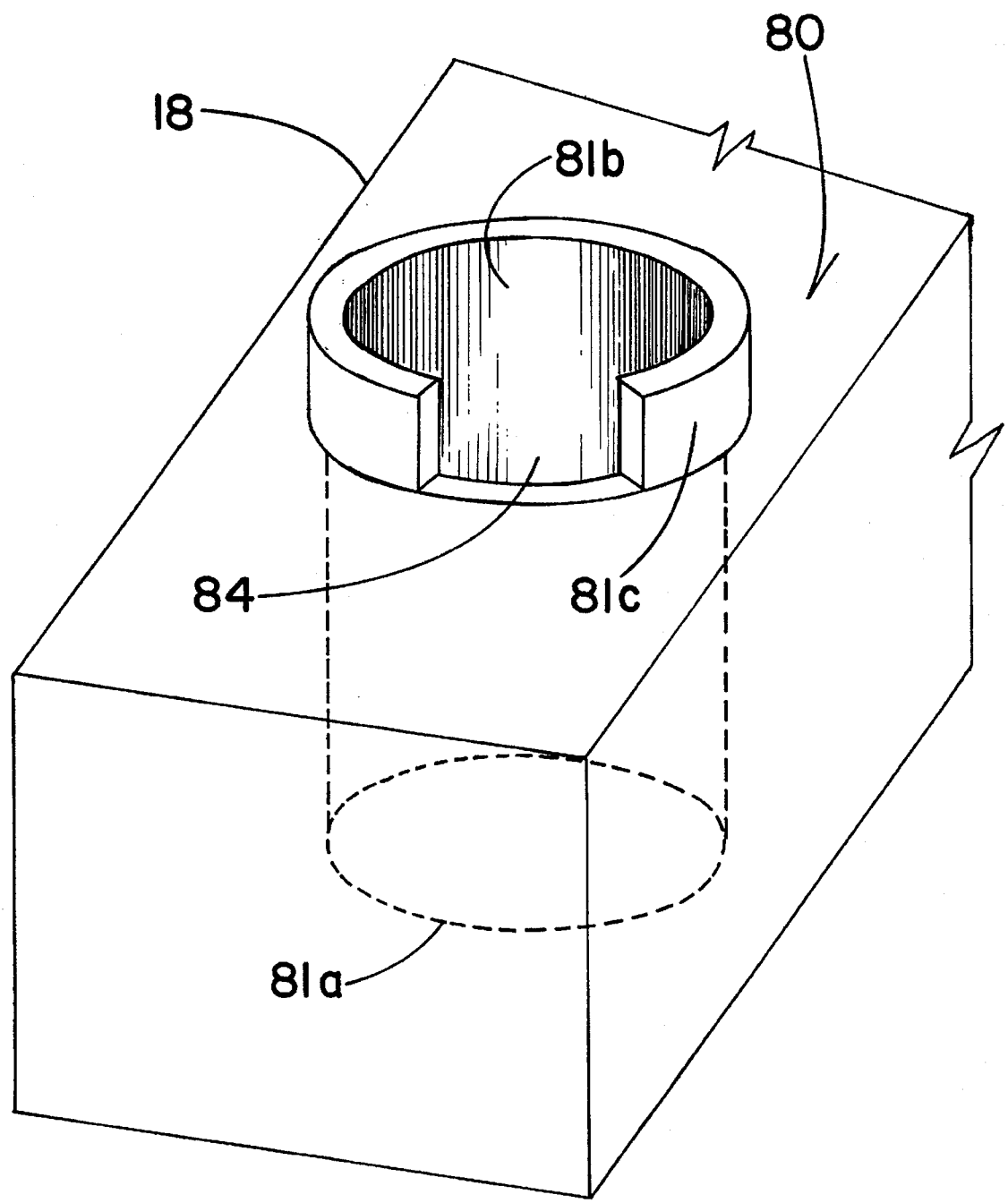
FIG. 4 is a perspective view of the cuff member which anchors the tray table to the safety seat.

FIG. 4 provides a perspective view of the cylindrical cuff member 80 positioned within the aperture in the seat side member 18. Each cylindrical cuff member 80 has a closed end 81a and an open end 81b, with the cuff member closed end positioned within a cylindrical aperture in the padding of the seat side member and the cuff member open end 81b positioned a selected distance above the surface of the seat side member, whereby the axis of the cylindrical cuff member 80 is oriented essentially perpendicular to the horizontal seat member. An enlarged collar 81c on the open end of the cuff member supports the cuff and positions it in the aperture in the seat side member 18 a selected distance thereabove. The cylindrical cuff member below the collar has a diameter smaller than the diameter of the cylindrical aperture in the seat side member, allowing the cuff member 80 to rotate within the aperture. Each collar and cuff contains a notch 84 described below.

Figure 5:
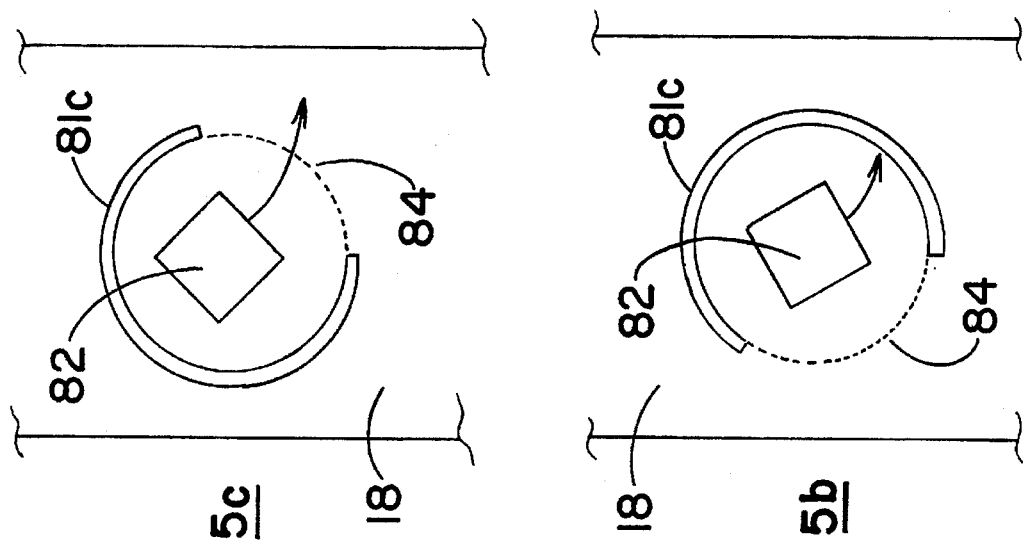
FIG. 5a, b and c are cross sectional view of the tray table, rotatable cuff and seat side member.
Figure 5:
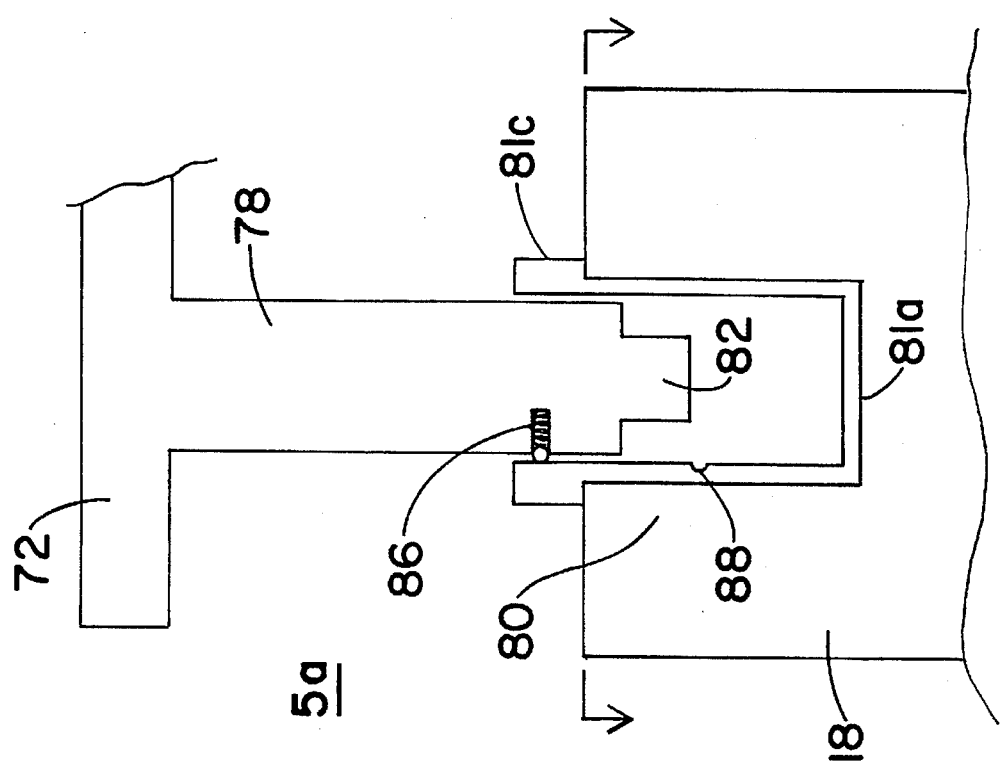

Referring to FIGS. 5a to 5c, vertical and horizontal cross sections of one side of the tray table member, seat side member and receptor cuff member are shown.

In FIG. 5a the end of the table leg 78 which inserts into the cylindrical receptor cuff 80 contains a smaller square or rectangular end portion 82. The end portion 82 is smaller in cross sectional area than that of the leg 78. Each receptor cuff 80 extends above the surface of the seat side member by the height of the collar 81c and contains a notch 84 formed by removal of about a 90°–120° section of the cuff and collar such that the bottom of the notch 84 is even with the top surface of the seat side member. (See FIG. 4) The cuff 80 can be rotated within the aperture in the seat side member such that the notch 84 is positioned to allow the rectangular portion of the leg to swing through the notch 84 when the legs of the table member are raised a selected distance above the bottom of the cuff 80. With one table leg acting as a pivot point, the other table leg moves on a circular arc away from the seat. The notch 84 in the cuff 80 for the moving leg is thus positioned to allow passage of the smaller rectangular portion of the leg through the notch as shown in FIG. 5c. With the other receptor cuff member 80 of the pair positioned so as to prevent movement of the rectangular portion of the stationary leg through that notch 84 as seen in FIG. 5b, the whole tray table may be rotated about the stationary leg of the tray table. The table legs 78 must be raised a portion of the way out of each cuff 80 to allow the rotation about one leg to occur and for the table to swing out of the way so the occupant may enter the seat.

Each leg 78 member contains a spring loaded spherical ball unit 86 which engages an internal groove 88 in the rotatable cuff 80 when the leg 78 is fully inserted into the cuff 80. The groove 88 extends around the whole internal circumference of each cuff member. This ball and groove system holds the table in a secured position but allows the table to be moved upwardly when an adult supplies an upward force to both legs simultaneously. The combination of friction between the fully inserted leg and the cuff member, along with the spring loaded ball in the leg member engaging the internal groove in the cuff member, provides sturdy, securable support for the tray table.

Figure 6:
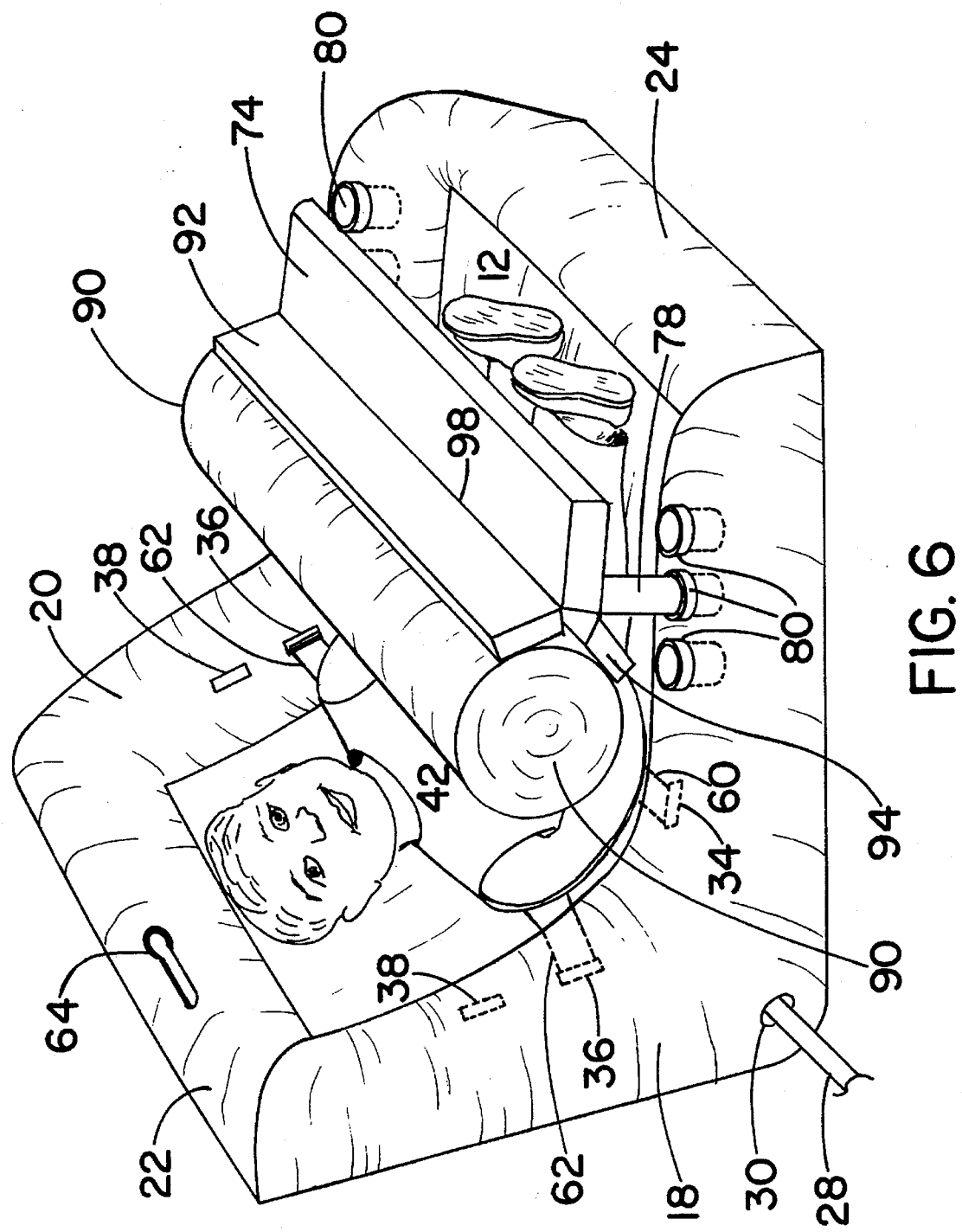
FIG. 6 shows the complete system with the occupant in the seat.

Referring again to FIG. 3, the tray portion member 72 of the tray table 70 contains an inflatable air bag device 90 if within the tray portion to further protect the safety seat occupant in the event of an accident. The section 92 of the tray top nearest the seat back and the section 94 of the tray bottom nearest the seat back are fastened together along a seam line 96 which extends about half way around the edge of the tray. Each partial top section 92 and partial bottom section 94 are hinged along a line 98 to the rest of the top and bottom portions of the tray respectively, with the bottom hinge hidden from view in FIG. 3. Upon deployment of the air bag 90, the seam 96 separates allowing the top section 92 and the bottom section 94 to move away from the seat occupant as the air bag inflates as shown in FIG. 6. The air bag cushions the head and upper torso of the seat occupant, further protecting the young person in the seat. The air bag is of conventional design similar to those now used in passenger vehicles, with an appropriate sensor device which causes the bag to inflate in the event of a vehicle accident. The full system with the young person in the seat, the tray table in place and the air bag deployed is shown in FIG. 6.

The foregoing description of the preferred embodiments of the invention have been presented for purposes of illustration and description. It is not intended to be exhaustive or to limit the invention to the precise form disclosed and obviously many modifications and variations are possible in light of the above teaching. It is intended that the scope of the invention be defined by the claims appended hereto.

I claim:

1. An assembly for releasably restraining and protecting a young person occupying a seat in a transport vehicle, said assembly comprising:

a contoured safety seat comprising a generally horizontal seat member and a generally vertical back rest member, said seat member and back rest member jointed at an intersect line;

two padded seat side members generally perpendicular to said seat and back rest members, a first side member attached to one side of said seat and back rest members and a second side member attached to the other side of said seat and back rest members, said side members each having an upper and a lower end, said seat, back rest, and side members forming a supported environment for a young person occupying said safety seat;

means for securely fastening said contoured safety seat to a standard transport vehicle seat;

a plurality of pairs of releasable first fastening members secured to each of said padded seat sides, one fastening member of each pair secured to said first seat side member and another fastening member of each pair secured to said second seat side member, including a first pair of releasable first fastening members located on said seat sides proximate to said intersection line between said seat member and said back rest member, and a second pair of releasable first fastening members located on said seat sides about half the distance from the intersection line and the top of said back rest member;

a torso enclosing suit with front and back portions, said suit containing two leg openings, two arm openings and one neck opening therein;

a closable entry opening in the suit for entry of the young person into said suit, said entry opening containing a closure means for securing said suit on the torso of a wearer;

a plurality of pairs of releasable second fastening members secured to said torso enclosing suit, including a first pair of releasable second fastening members, one of each secured to the front portion of said suit just above each leg opening therein, and a second pair of second fastening members, one of each secured to the back portion of said suit at a back of each arm opening therein;

whereby the fastening of said first pair of first fastening members on said seat sides to said first pair of second fastening members on said suit and the fastening of said second pair of first fastening members on said seat sides to said second pair of second fastening members on said suit is adapted to restrain and protect a young person wearing said torso enclosing suit when positioned in said contoured safety seat in the event of a vehicle accident; and one or more pairs of rotatable cylindrical cuff members, one of each pair located in said first seat side member, and the other of the pair located in said second seat side member, said cylindrical cuff member having a closed end and an open end, with said cuff member closed end positioned within a cylindrical aperture in the padding of said seat side member and said cuff member open end positioned a selected distance above a surface of said seat side member, whereby an axis of said cylindrical cuff member is oriented essentially perpendicular to said horizontal seat member, said cylindrical cuff member having a diameter smaller than a diameter of said cylindrical aperture in said seat side member, allowing said cuff member to rotate within said aperture, said pairs of cuff members positioned about half the distance from the intersection line between said seat member and said back rest member and the front of said seat member.

2. An assembly according to claim 1 further comprising a collar member secured around said open end of said cuff member, said collar member having a diameter greater than the diameter of said aperture in said seat side member, whereby said collar member positions said cuff member a selected distance above the surface of said seat side member.

3. An assembly according to claim 1 further comprising a padded head rest member attached to the top of said back rest member and to the upper ends of said seat side members, and a padded leg support member attached to the front of said seat member and to the lower ends of said seat side members.

4. An assembly according to claim 1 wherein said means for securely fastening said seat to a standard vehicle seat is a pair of apertures in said seat side members positioned close to said intersect line between said seat and back rest, and a lap safety belt threaded through said apertures and tightened for securing said seat tightly to said vehicle seat.

5. An assembly according to claim 1 further comprising a third pair of releasable first fastening members, one of each pair located on each seat side member adjacent said second pair of first fastening members.

6. An assembly according to claim 1 wherein said first fastening members are female seat belt receptors secured to said seat sides.

7. An assembly according to claim 1 wherein said second fastening members are male seat belt insertions secured to said torso enclosing suit.

8. An assembly according to claim 1 further comprising means for simultaneously releasing all first fastening members on said safety seat from all second fastening members on said torso enclosing suit.

9. An assembly according to claim 8 wherein said means comprises cables connected to all first fastening members internal to said safety seat, and an external lever to move said cables and open said first fastening members, releasing said second fastening members therefrom.

10. An assembly according to claim 1 wherein said entry opening in said suit extends from one arm opening to near the leg opening on a same side of said suit.

11. An assembly according to claim 1 wherein said entry opening in said suit extends from said neck opening to about the center of said back portion of said suit.

12. An assembly according to claim 1 wherein said closure means comprises a heavy zipper.

13. An assembly according to claim 1 wherein said closure means comprises a loop and hook fastening system.

14. An assembly according to claim 1 wherein said suit is comprised of a mesh type synthetic fabric.

15. An assembly according to claim 1 further comprising a short length of strapping material securing each of said second fastening members to said torso enclosing suit.

16. An assembly according to claim 1 further comprising;

a removable table member comprising a generally rectangular horizontal tray portion member with top and bottom sides and a pair of cylindrical legs each with first and second ends, said first end of each leg connected to the bottom side and near opposite edges of said tray member, and said second end of each leg removably insertable and securable into said cuff members in each of the seat side members of said contoured safety seat such that said tray member is positioned at mid-torso level for a young person occupying said safety seat; and an inflatable air bag device contained within said tray table portion member, said air bag device deploying and inflating for protecting the head and upper torso of a young person occupying said safety seat in an accident.

17. An assembly according to claim 16 wherein said second end of each leg which inserts into said cylindrical receptor cuff member has a generally rectangular end portion, smaller in cross section than said cylindrical leg, said cuff members each having a notch opening in a surface adjacent said cuff member open end, said notch opening allowing said rectangular leg end portion to pass through said notch with the notch oriented on a circular arc generated by one leg member acting as a pivot point and the other leg member moving along said circular arc, and said notch preventing passage of said leg member with the notch oriented off of said circular arc.

18. An assembly for releasably restraining and protecting a young person occupying a seat in a transport vehicle, said assembly comprising:

a contoured safety seat comprising a generally horizontal seat member and a generally vertical back rest member, said seat member and back rest member jointed at an intersect line;

two padded seat side members generally perpendicular to said seat and back rest members, a first side member attached to one side of said seat and back rest members and a second side member attached to the other side of said seat and back rest members, each side member having an upper and a lower end;

a horizontal padded head rest member attached to the top of said back rest member opposite said intersect line and to the upper end each of said seat sides;

a horizontal padded leg support member attached to the front of said seat member opposite said intersect line and to the lower end of each of said seat side members, said seat, back rest, side members, head rest and leg rest forming a supported environment for a young person occupying said safety seat;

means for securely fastening said contoured safety seat to a standard transport vehicle seat;

a plurality of pairs of releasable female fastening members secured to each of said padded seat sides, one fastening member of each pair secured to said first seat side member and another fastening member of each pair secured to said second seat side member, including a first pair of releasable female fastening members located on each seat side proximate to said intersection line between said seat member and said back rest member, and a second pair of releasable female fastening members located on said seat sides about half the distance from the intersection line between said seat member and said back rest member and the top of said back rest member;

a torso enclosing suit with front and back portions, said suit containing two leg openings, two arm openings and one neck opening therein;

a closable entry opening in the suit for entry of the young person into said suit, said entry opening containing a closure means for securing said suit on the torso of a wearer;

a plurality of pairs of releasable male fastening members secured to said torso enclosing suit, including a first pair of releasable male fastening members, one of each secured to the front portion of said suit just above each leg opening therein, and a second pair of male fastening members, one of each secured to the back portion of said suit at a back of each arm opening therein;

whereby the fastening of said first pair of female fastening members on said seat side to said first pair of male fastening members on said suit and the fastening of said second pair of female fastening members on said seat sides to said second pair of male fastening members on said suit is adapted to restrain and protect a young person wearing said torso enclosing suit when positioned in said contoured safety seat in the event of a vehicle accident;

a removable table member comprising a generally rectangular horizontal tray portion member with top and bottom sides and a pair of cylindrical legs each with first and second ends, said first end of each leg connected to the bottom side and near opposite edges of said tray member, and said second end of each leg removably insertable and securable into one of a pair of cylindrical receptor cuff members in each of the seat side members of said contoured safety seat, said cylindrical cuff member having a closed end and an open end, with said cuff member closed end positioned within a cylindrical aperture in the padding of said seat side member and said cuff member open end positioned a selected distance above a surface of said seat side member, a collar member secured around said open end of said cuff member, said collar member having a diameter greater than a diameter of said aperture in said seat side member, whereby said collar member positions said cuff member said selected distance above the surface of said seat side member; whereby an axis of said cylindrical cuff member is oriented essentially perpendicular to said horizontal seat member, said cylindrical cuff member having a diameter smaller than the diameter of said cylindrical aperture in said seat side member, allowing said cuff member to rotate within said aperture, such that said tray member is positioned at mid-torso level for a young person occupying said safety seat; and an inflatable air bag device contained within said tray table portion member, said air bag device deploying and inflating for protecting the head and upper torso of a young person occupying said safety seat in an accident.

19. An assembly according to claim 18 wherein said second end of each leg which inserts into said cylindrical receptor cuff member has a generally rectangular end portion, smaller in cross section than said cylindrical leg, said cuff members each having a notch opening in a surface adjacent said cuff member open end, said notch opening allowing said rectangular leg end portion to pass through said notch with the notch oriented on a circular arc generated by one leg member acting as a pivot point and the other leg member moving along said circular arc, and said notch preventing passage of said leg member with the notch oriented off of said circular arc.

20. An assembly according to claim 18 wherein said means for securely fastening said seat to a standard vehicle seat is a pair of apertures in said seat side members positioned close to said intersect line between said seat and back rest, and a lap safety belt threaded through said apertures and tightened for securing said seat tightly to said vehicle seat.

* * * * *